US011470029B2

(12) United States Patent
Ryan et al.

(10) Patent No.: US 11,470,029 B2
(45) Date of Patent: Oct. 11, 2022

(54) ANALYSIS AND REPORTING OF SUSPICIOUS EMAIL

(71) Applicant: Edgewave, Inc., La Jolla, CA (US)

(72) Inventors: Louis Ryan, Los Gatos, CA (US); Robert Crowe, Ramona, CA (US); Steven Christopher Kelley, Rancho Santa Fe, CA (US); John Randall, Rancho Santa Margarita, CA (US); Gang Ding, San Diego, CA (US)

(73) Assignee: Edgewave, Inc., La Jolla, CA (US)

( * ) Notice: Subject to any disclaimer, the term of this patent is extended or adjusted under 35 U.S.C. 154(b) by 777 days.

(21) Appl. No.: 16/176,791

(22) Filed: Oct. 31, 2018

(65) Prior Publication Data
US 2019/0132273 A1 May 2, 2019

Related U.S. Application Data

(60) Provisional application No. 62/579,751, filed on Oct. 31, 2017.

(51) Int. Cl.
*H04L 9/40* (2022.01)
*G06F 40/284* (2020.01)
*H04L 51/212* (2022.01)

(52) U.S. Cl.
CPC .......... *H04L 51/212* (2022.05); *G06F 40/284* (2020.01); *H04L 63/1433* (2013.01); *H04L 63/1466* (2013.01); *H04L 63/1483* (2013.01)

(58) Field of Classification Search
CPC . H04L 51/12; H04L 63/1433; H04L 63/1466; H04L 63/1483; H04L 63/145; H04L 63/1416; G06F 40/284
See application file for complete search history.

(56) References Cited

U.S. PATENT DOCUMENTS 9,781,149 B1 10/2017 Himler et al.
2004/0177110 A1 9/2004 Rounthwaite et al.
(Continued)

OTHER PUBLICATIONS

International Search Report and Written Opinion issued in International Application No. PCT/US2018/58511, dated Jan. 24, 2019. 12 pages.

*Primary Examiner* — Farid Homayounmehr
*Assistant Examiner* — Suman Debnath
(74) *Attorney, Agent, or Firm* — Mintz, Levin, Cohn, Ferris, Glovsky and Popeo, P.C.

(57) ABSTRACT

Machine learning based methods for the analysis and reporting of suspicious email are disclosed. In one aspect, there is a method that includes displaying a user-selectable icon to report a suspicious electronic message. The method further includes receiving selections of the electronic message and the user-selectable icon. The method further includes quarantining the electronic message in response to the selections. The method further includes electronically communicating the electronic message to a processor for performing threat analysis in response to the selections. The method further includes receiving a response message in response to the performed threat analysis, the response message indicating a threat status of the electronic message. The method further includes processing the electronic message in response to the response message, wherein processing comprises at least one of deleting the electronic message, leaving the electronic message in quarantine, and/or moving the electronic message to the first folder.

27 Claims, 11 Drawing Sheets

(56) References Cited

U.S. PATENT DOCUMENTS

2007/0136808 A1* 6/2007 Xiong .................. G06F 21/566
726/22
2010/0153394 A1* 6/2010 Wood ................... G06Q 10/107
707/737
2015/0026804 A1  1/2015 Wood
2016/0014151 A1  1/2016 Prakash
2016/0301705 A1* 10/2016 Higbee ............... H04L 63/1433
2017/0237776 A1  8/2017 Higbee et al.
2017/0244736 A1* 8/2017 Benishti ............. H04L 63/1483

* cited by examiner

FIG. 5C

```
IMG = https://static1.icloud.com/emailimages/v4/common/apple_logo_web@2x.png
IMG = http://r.mzstatic.com/email/images_shared/giftcards/music1x.jpg
A = https://█████8cgqChvfck // SECTION ----------------------------------------------------------
// Content-Type: text/html
// Transfer-Encoding: base64
// Cooked-Size: 1865 receipt apple id EMAIL billed to visa ....
7331 18 rutland ave nj,
nj 07032-2129 usa total $114.99 date maya?3,
2018 order id 1201805101 document no.
11112140001 apple music type purchased from price apple music family membership monthlya?|a?may 3,
2018 subscription $114.99 subtotala?a?
$114.99 taxa?a?
$0.00 total $114.99 if you have any questions about your bill,
visit itunes support.
learn how to manage your password preferences for itunes,
ibooks,
and app store purchases.
a?
apple id summarya?a?ca?terms of salesa?a?ca?privacy policy copyright ac 2018 apple inc.
all rights reserved receiptappleidEMAILbilladtovisarutlandavenjnjusatotaldatemayaorderiddocumentnoapplemusictypepurchase
laidsummaryascatermsofsaleascaprivacypolicycopyrightacappleincallrightsreserved

ANALYSIS AND REPORTING OF SUSPICIOUS EMAIL

CROSS REFERENCE TO RELATED APPLICATIONS

The present application claims priority to U.S. Patent Application No. 62/579,751, filed Oct. 31, 2017, entitled ANALYSIS AND REPORTING OF SUSPICIOUS EMAIL, the disclosure of which are incorporated herein by reference in its entirety.

TECHNICAL FIELD

The subject matter described herein relates to analysis and reporting of suspicious email messages.

BACKGROUND

In computing, phishing is an attempt to fraudulently acquire sensitive information, such as passwords and credit card details, by masquerading as a trustworthy person or business in an electronic communication. The objective is to lure a user to connect and present authentication credentials to an illegitimate party who often masquerades as a legitimate entity. Sometimes, the phisher fools the user by email spoofing or sending an apparently official electronic communication, such as an email or an instant message. Sometimes, phishing mails may contain links to websites that are infected with malware. The term phishing arises, in part, from the use of increasingly sophisticated lures to "fish" for users' financial information and passwords.

Phishing attacks have become common place for most cyber-targeted attacks today. In fact, many successful data breaches started with a phishing attack. However, phishing attacks have adapted and evolved—combined with other techniques to launch blended attacks that are harder to detect with just automated technology.

Thus, there is a need for an improved system and method for providing security against phishing and other attacks. Embodiments described herein serve to protect against suspicious email phishing and other attacks.

SUMMARY

Systems, methods, and articles of manufacture, including computer program products, are provided for the analysis and reporting of suspicious email. In one aspect the method includes receiving an electronic message associated with an email address of a user into a first folder. The method further includes displaying a user-selectable icon to report a suspicious electronic message. The method further includes receiving selections of the electronic message and the user-selectable icon. The method further includes quarantining the electronic message in response to the selections. The method further includes electronically communicating the electronic message to a processor for performing threat analysis in response to the selections. The method further includes attaching, in response to the forwarding, one or more headers to the electronic message. The method further includes receiving a response message in response to the performed threat analysis, the response message comprising the one or more headers and indicating a threat status of the electronic message. The method further includes processing the electronic message in response to the response message, wherein processing comprises at least one of deleting the electronic message, leaving the electronic message in quarantine, and/or moving the electronic message to the first folder.

In optional variations one or more additional features, including but not limited to the following, can be included in any feasible combination. For example, the method may further include updating a blacklist and/or a predelivery checklist in response to the threat status of the electronic message. The method may further include electronically communicating the electronic message to the processor for performing threat analysis in response to at least one of: a sender of the electronic message has not sent a previous electronic message to the email address of the user, a variation in a spelling of a name of the sender as compared to previous electronic messages sent by the sender to the email address of the user, the electronic message originating from a sending system that is not associated with other electronic messages received by the email address of the user, or the electronic message having a calculated fingerprint that matches a fingerprint in a fingerprint database having a malicious threat status at a confidence level less than a confidence level threshold. The threat status may include a traffic light indicator, the traffic light indicator red or stop for electronic messages corresponding to a known threat, the traffic light indicator yellow or caution for electronic messages corresponding to a possible threat, the traffic light indicator green or proceed for electronic messages not associated with a known threat or suspected of being a threat. The threat status may include a threat category. The threat category may include at least one of a safe message, a malicious message, a phishing message, a virus, a spam message, and/or a pornographic message. The method many further include decomposing the electronic message into at least one header or header list, at least one body, and, if the electronic message comprises an attachment, at least one attachment. The method many further include generating a header fingerprint for each at least one header or header list. The method many further include parsing each at least one body. The method many further include normalizing each at least one body. The method many further include generating a body fingerprint for each parsed and normalized at least one body. The method many further include generating, if the electronic message comprising an attachment, an attachment fingerprint for each at least one attachment. The method many further include aggregating each at least one header fingerprint, each at least one body fingerprint. The method many further include, if the electronic message comprises an attachment, each at least one attachment fingerprint, into a message fingerprint. The method may further include moving to quarantine other electronic messages with message fingerprints in a fingerprint database that match the message fingerprint of the electronic message. Each at least one body may include at least one of a uniform resource locator (URL), a text formatted body, and a binary formatted body. Each attachment may include at least one of a text formatted attachment and a binary formatted attachment. Generating a header fingerprint for each at least one header or header list may include lexically analyzing each at least one header or header list. Lexically analyzing may include at least one of identifying the number of each type of header or header list, analyzing the lexical format of each header or header list, analyzing frequency and patterns of white space within each header or header list, analyzing frequency and patterns of special characters within each header or header list, and comparing the source and message routing in a header list for consistency. Generating a header fingerprint for each at least one header or header list may include applying, for each header, a header hash algorithm to the at least one header and/or applying, for each header list, a header list hash algorithm. Parsing the at least one body may include identifying and organizing components of each at least one body using syntactic and/or semantic analysis, Normalizing the at least one body may include at least one of normalizing white spaces, transposing letters to correct spelling, removing excess punctuation, removing hyphenation, removing hypertext markup language, and/or replacing incorrectly substituted characters, such as Os for zeros, or unaccented characters for accented characters with diacritical marks. Generating a body fingerprint may include applying, for each URL, a URL hash algorithm to generate a URL body fingerprint for each URL. Generating a body fingerprint may include applying, for each text formatted body, a text body hash algorithm to generate a text body fingerprint for each text body. Generating a body fingerprint may include applying, for each binary formatted body, a binary body hash algorithm to generate a binary body fingerprint for each binary formatted body. The URL hash algorithm may include a traditional hash. The text body hash algorithm may include a similarity hash. The binary body hash algorithm may include a fuzzy hash. Generating an attachment fingerprint may include applying, for each text formatted attachment, a text attachment hash algorithm to generate a text attachment fingerprint for each text attachment. Generating an attachment fingerprint may include applying, for each binary formatted attachment, a binary attachment hash algorithm to generate a binary attachment fingerprint for each binary formatted attachment. The text attachment hash algorithm may include a similarity hash. The binary attachment hash algorithm may include a fuzzy hash. Performing the threat analysis may include generating at least one of a raw view, a parsed view, and a browser view of the electronic message. Performing the threat analysis may include analyzing at least part of the electronic message to collect threat status indicators. Performing the threat analysis may include automatically generating the threat status of the electronic message in response to the threat status indicators. Performing the threat analysis may include assigning a confidence level to the threat status of the electronic message. Performing the threat analysis may include requesting manual generation of the threat status of the electronic message if the confidence level is below a confidence level threshold. Performing the threat analysis may include updating the threat status with the manually generated threat status. The raw view of the electronic message may correspond to the text of the electronic message before parsing and normalizing the at least one body. The parsed view of the electronic message may correspond to a reordering of the electronic message into a consistent format after parsing and normalizing the at least one body. The browser view of the electronic message may correspond to an HTML view of the electronic message after parsing and normalizing the at least one body. Analyzing at least part of the electronic message to collect threat status indicators may include applying a plurality of rules in a rules database to at least part of the electronic message to identify whether each of the plurality of rules matches the at least part of the electronic message. The rules in the rules database were previously assigned a rule threat status. Each identified matching rule and each corresponding rule threat status may correspond to a threat status indicator. Analyzing at least part of the electronic message to collect threat status indicators may include scanning the at least part of the electronic message to identify whether the at least part of the electronic message includes at least one virus in at least one antivirus database. Each identified virus may correspond to the threat status indicator for the scan. Analyzing at least part of the electronic message to collect threat status indicators may include querying a URL threat database for the URL and URL threat status, for each URL in the electronic message to identify whether the at least one URL in the electronic message includes at least one URL in the at least one URL threat database. Each identified URL in the URL threat database and corresponding URL threat status may correspond to the threat status indicator for the URL threat database query. Analyzing at least part of the electronic message to collect threat status indicators may include analyzing the at least one header for compliance with at least one rule for headers. The rule for headers may include including no more than one message ID in an electronic message. Analyzing at least part of the electronic message to collect threat status indicators may include identifying a risky command or behavior within the electronic message. The risky command or behavior may include executing code or a macro when a user opens the electronic message or one of the at least one attachments. Analyzing at least part of the electronic message to collect threat status indicators may include a domain name service analysis. The domain name service analysis may include extracting IP addresses, and domain names from headers, and URLs within the at least one part of the electronic message. The domain name service analysis may include resolving extracted domain names to IP addresses. The domain name service analysis may include, for each domain name, identifying a registration age, a domain name reputation, and an obfuscation. The domain name service analysis may include, for each IP address, identifying an IP address reputation and a geolocation. The domain name service analysis may include determining a domain name service threat status corresponding to the threat status indicator for the domain name service analysis. Analyzing at least part of the electronic message to collect threat status indicators may include comparing the message fingerprint with multiple fingerprints in a fingerprint database. The fingerprints in the fingerprint database may have been previously assigned a fingerprint threat status. Each identified matching fingerprint and each corresponding fingerprint threat status may correspond to threat status indicators, The type of fingerprint match may be an exact match, an inclusive match, a similarity hash match, and/or a fuzzy hash match. Analyzing at least part of the electronic message to collect threat status indicators may include electronically communicating the electronic message to a security sandbox. The security sandbox may be a compartmentalized computing environment designed to isolate and monitor security flaws. Analyzing at least part of the electronic message to collect threat status indicators may include activating the electronic message in the security sandbox. Analyzing at least part of the electronic message to collect threat status indicators may include monitoring the activated electronic message for suspicious execution traits. Analyzing at least part of the electronic message to collect threat status indicators may include identifying the suspicious execution traits in a database of known suspicious execution traits. Analyzing at least part of the electronic message to collect threat status indicators may include calculating a sandbox threat status indicator in response to the identified suspicious execution traits. Requesting manual generation of the threat status of the electronic message may include providing, for manual review, a heatmap of the aggregated fingerprint and the threat status indicators for the electronic message, the raw view of the electronic message, the parsed view of the electronic message, the browser view of the electronic message, and/or the threat status indicators.

Systems and methods consistent with this approach are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system or system architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 5C is a raw view of the electronic message of FIG. 5B;

FIG. 5D is a parsed view of the electronic message of FIGS. 5B and 5C;

When practical, similar reference numbers denote similar structures, features, or elements.

DETAILED DESCRIPTION

The presently described subject matter provides solutions to monitor data being processed on a system, such as an enterprise computing system, and flag suspicious data for further processing to determine the legitimacy of the suspicious data. Conventional techniques of application execution control for programs run on computer systems rely on static methods such as databases of signatures to determine if a computer can safely run a particular program. The presently described subject matter provides machine learning based solutions to avoid the necessity to continually update databases of signatures.

Figure 1:
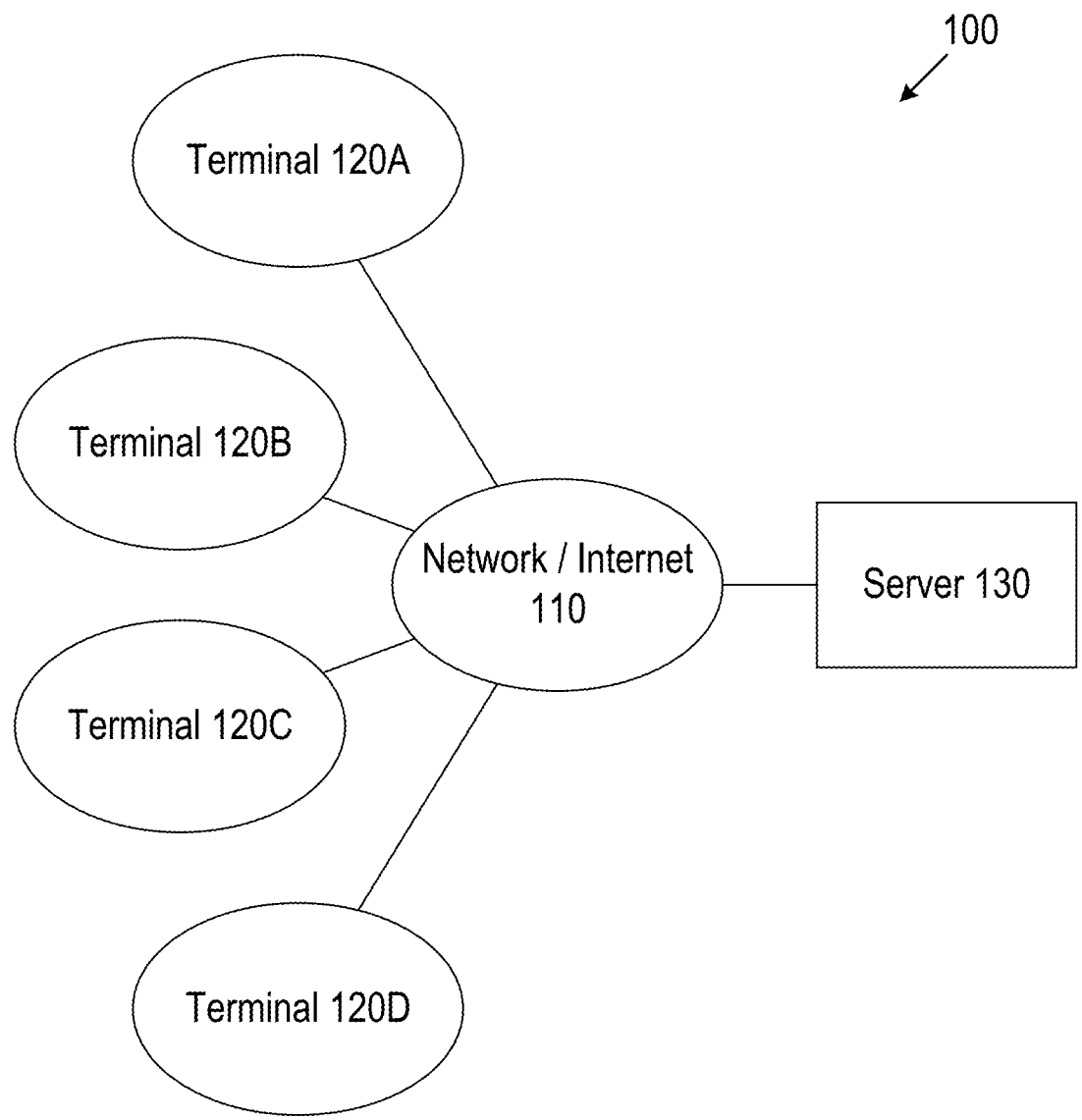
FIG. 1 is an illustration of a computer network having one or more features consistent with the present description.

FIG. 1 is an illustration of a computer network 100 having one or more features consistent with the present description. The computer network 100 is an exemplary illustration of one manner in which a computer network system may be set up. Computer network 100 comprises a plurality of computer terminals 120A, 120B, 120C, and 120D each configured to interact with a corresponding user and communicate, i.e., send and receive data, over a communication network 110. In some aspects, the computer network 100 can include a larger or smaller number of computer terminals than the four representative devices 120 depicted in FIG. 1. Computer terminals 120 may be wireless communication devices and may include, e.g., personal computers (PCs), laptop PCs, tablets, mobile/smart phones, and computer servers that serve as network services management devices, data repositories, and the like. Communication network 110 can include one or more wide area networks (WANs), such as the Internet, and one or more local area networks (LANs), which may include wireless LANs (WLANs) to connect with computer terminals 120. Computer terminals 120 may be part of an enterprise network configured to serve a business enterprise, such as a corporation, government agency, and the like. An enterprise network includes (i) many networked personal computer terminals (e.g., laptops and smart phones) each to provide computer services to a corresponding employee/user, and (ii) one or more networked servers to provide centralized management of such services. Alternatively, computer terminals 120 may be stand-alone devices that are not part of an enterprise network.

As shown in FIG. 1, the computer network 100 may also comprise a server 130. In some aspects, the server 130 may comprise a server configured to serve as network services management devices, data repositories, and the like. In some aspects, the server 130 may comprise a mail server configured to store and forward email messages among the computer terminals 120. In other aspects, the server 130 may comprise an anti-virus and/or anti-phishing server configured to manage suspicious email processes, including suspicious email reporting and handling. In some embodiments, a computer terminal 120 may also be used as a server 130 and a server 130 may also be used as a computer terminal 120.

Whether computer terminals 120 are stand-alone or part of an enterprise network, the computer terminals each host and/or have access to an email application (also referred to herein as an "email app") to provide a user with email services. Examples include Microsoft Outlook®, GMAIL®, and mobile applications such as mail.com for various operating systems, and so on. In some aspects, the email app enables email messages to be created, sent to the communication network 110, received from the communication network 110, and displayed via a Graphical User Interface (GUI) of the email app. Received (and displayed) email messages may include email messages from known/trusted senders and associated email addresses, as well as unsolicited email messages from unknown senders and associated email addresses.

In some implementations, a user may suspect that a received, displayed, unsolicited email message is malicious in nature. Such a "suspicious" email may include malware, e.g., viruses, spyware, and the like, or may be part of a phishing attack. As described above, a phishing attack uses spoofed email messages and websites in an attempt to gain unauthorized access to personal and sensitive information about the user. The attacker masquerades as a familiar organization in contacting the targeted victim (user). The user is invited to visit an embedded link (e.g., Uniform Resource Locators (URLs)/hyperlinks) in the email message, download, or open a file attachment of the email message, or simply respond to the sender (email address) of the suspicious email.

If a user suspects that a received, displayed email message may be malicious, techniques provided herein enable the user to report the suspected email as a "suspicious email" in a convenient and consistent manner. Once the suspicious email has been reported, a program can perform an analysis on the email and report the results of the analysis to the user.

Figure 2:
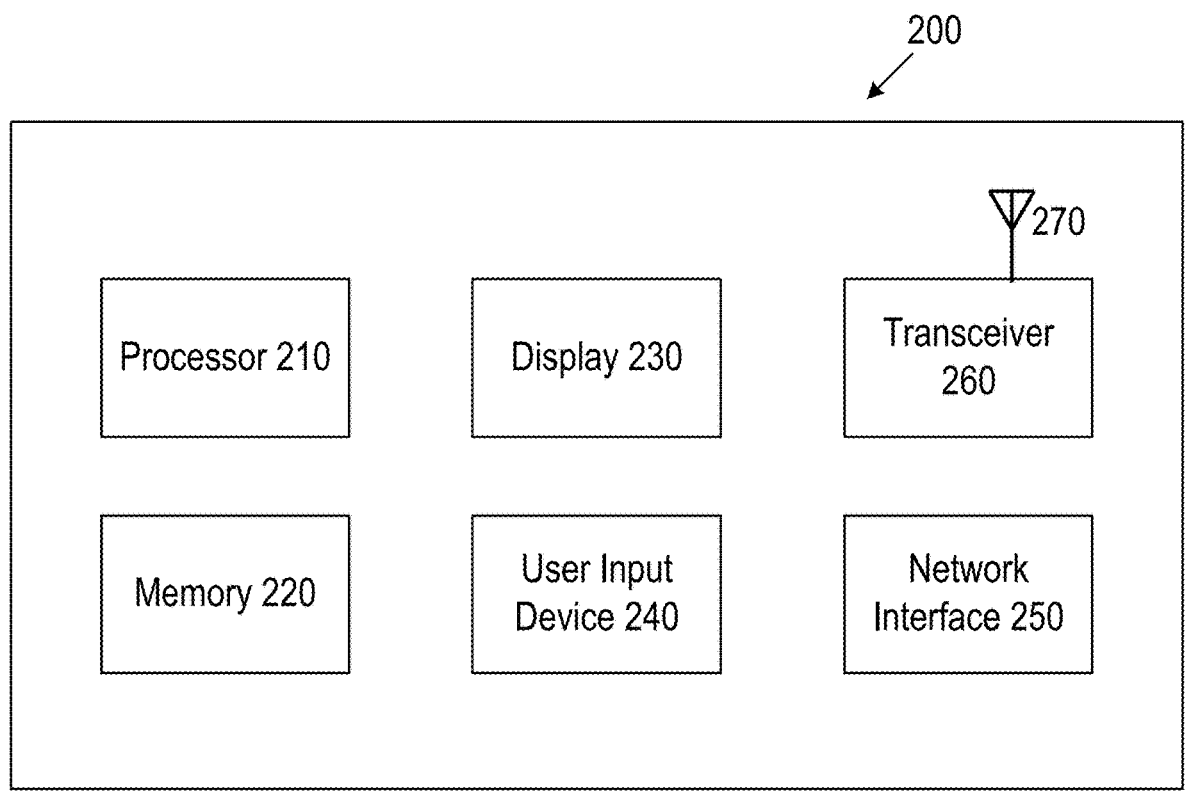
FIG. 2 is a block diagram illustrating a computing apparatus, having one or more features, consistent with the present description.

With reference to FIG. 2, there is an example block diagram of computer terminal 200 corresponding to any of computer terminals 120 in FIG. 1. The computer terminal 200 can include a processor 210 which controls operation of the computer terminal 200. The processor 210 can also be referred to as a central processing unit (CPU). Memory 220, which can include both read-only memory (ROM) and random access memory (RAM), can provide instructions and data to the processor 210. A portion of the memory 220 can also include non-volatile random access memory (NVRAM), magnetic disk storage media devices, optical storage media devices, flash memory devices, electrical, optical, or other physical/tangible (e.g., non-transitory) memory storage devices. The processor 210 typically performs logical and arithmetic operations based on program instructions stored within the memory 220. The instructions in the memory 220 can be executable to implement the methods described herein.

For example, the memory 220 stores or is encoded with instructions for a security application (e.g., ThreatTest application) to perform suspicious email functions to enable a user to report a suspicious email message and perform threat analysis of the reported (suspicious) email message according to techniques provided herein. The security application may be any commercially available email program and may be modified as necessary to support the operations described herein. In addition, the memory 220 may include one or more databases to store rules with known threats, known viruses, IP address threat information, domain name threat information, hostname threat information, uniform record locator (URL) threat information, fingerprint threat information, sandbox threat information, email user lists, malware lists, and other data used in suspicious email analysis. The memory 220 can also store GUI logic to support user interactions described herein.

The processor 210 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The computer terminal 200 can also include a transceiver 260 to allow transmission and reception of data between the computer terminal 200 and a remote location. The computer terminal 200 may comprise an antenna 270 coupled to the transceiver 260. The computer terminal 200 can also include (not shown) multiple transmitters, multiple receivers, multiple transceivers, and/or multiple antennas. Transceiver 260 may be configured to interoperate with any cellular telephone standard including, but not limited to 2G/3G/4G/5G/ and/or Global System for Mobile Communications (GSM) interface.

The computer terminal 200 can further comprise a user input device 240 in some aspects. The user input device 240 can comprise a keypad, a microphone, a speaker, and/or a display. The user input device 240 can include any element or component that conveys information to a user of the computer terminal 200 and/or receives input from the user. For example, feedback provided to the user can be any form of sensory feedback, such as for example visual feedback, auditory feedback, or tactile feedback; and input from the user may be received in any form, including, but not limited to, acoustic, speech, or tactile input. The computer terminal 200 can further comprise a battery (not shown) to power the computer terminal 200.

The computer terminal 200 can comprise a display device such as display 230 which may include for example a cathode ray tube (CRT) or a liquid crystal display (LCD) or a light emitting diode (LED) monitor or other device for displaying information to the user. The computer terminal 200 can further comprise a network interface 250. The network interface 250 may comprise wired and wireless network interfaces. Wired interfaces may include a universal serial bus (USB) interface, Ethernet interface, or any other wired interface. Wireless interfaces may include WiFi (any of the IEEE 802.11 family of standards), WiMAX (any of the IEEE 802.16 family of standards), Bluetooth, or any other wireless interface.

The various components of the computer terminal 200 can be coupled together by a bus system. The bus system can include a data bus, for example, as well as a power bus, a control signal bus, and a status signal bus in addition to the data bus. The components of the computer terminal 200 can be coupled together or accept or provide inputs to each other using some other mechanism. Although a number of separate components are illustrated in FIG. 2, one or more of the components can be combined or commonly implemented. Further, each of the components illustrated in FIG. 2 can be implemented using a plurality of separate elements.

Figure 3A:
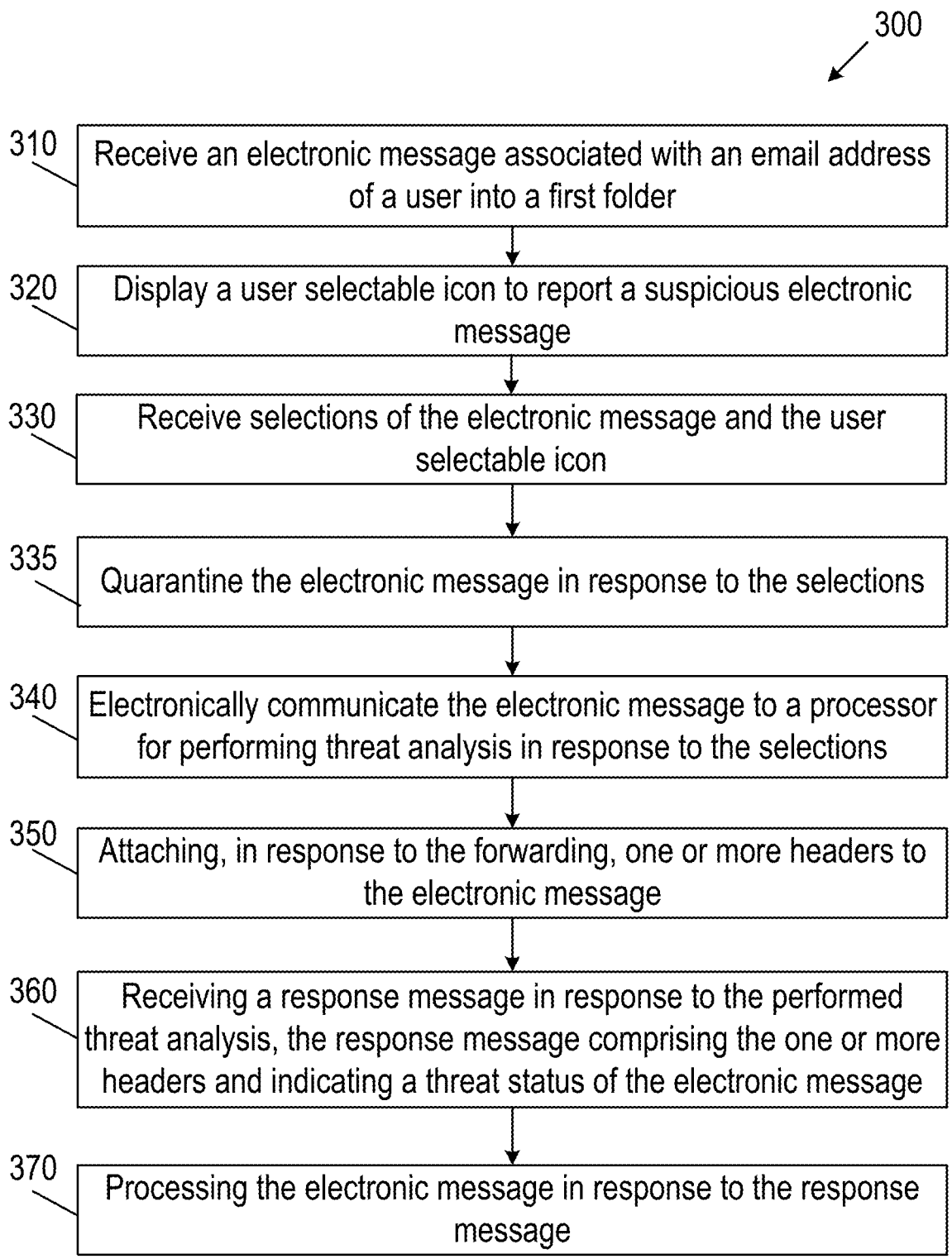
FIG. 3A is a flowchart of a process for analyzing and reporting a suspicious electronic message, consistent with the present description.

FIG. 3A is a flowchart of a process 300 for analyzing and reporting a suspicious electronic message. Referring to FIGS. 1, 2, and 3, the process 300 may be performed by the computer terminal 200, which may correspond to one of the computer terminals 120A, 120B, or 120C, or server 130 of computer network 100.

At 310, a user terminal 120 (or computer terminal 200) receives an electronic message associated with an email address of a user into a first folder. For example, a user terminal 120 may utilize a email security service (e.g., security application), designed to accelerate end user security awareness and advanced threat detection of real-time cyber threats. In some aspects, the security application or "application" may comprise the EdgeWave ThreatTest application. The security application can be a user-driven, advanced threat detection and prevention service that helps enterprises extend security awareness and training to the end users. In some aspects, the security application may be integrated with security awareness and training solutions as well as other industry-leading email security technologies (e.g., EdgeWave ePrisim Email Security applications).

In some implementations, the computer network 100 may include a security server or security application (e.g., Threat-Test add-in) primarily designed for processing emails from email apps (e.g., MS Exchange or Office 365). The processed emails can be stored or integrated with various 3rd party systems/archives or storage systems on premise as well as on cloud. The security server or security application can provide a way of implementing the actual processing task of email threat analysis and integrating it with the 3rd party system. The security application or server may also provide client side SDK for integration with basically any extensible client application. For example, the application may comprise an Outlook add-in framework which provides an Office 365 user a unified and integrated way of accessing information the security application Outlook add-in provides. The terms plug-in, add-in, add-on, or extension as used herein may be used interchangeably.

Figure 3B:
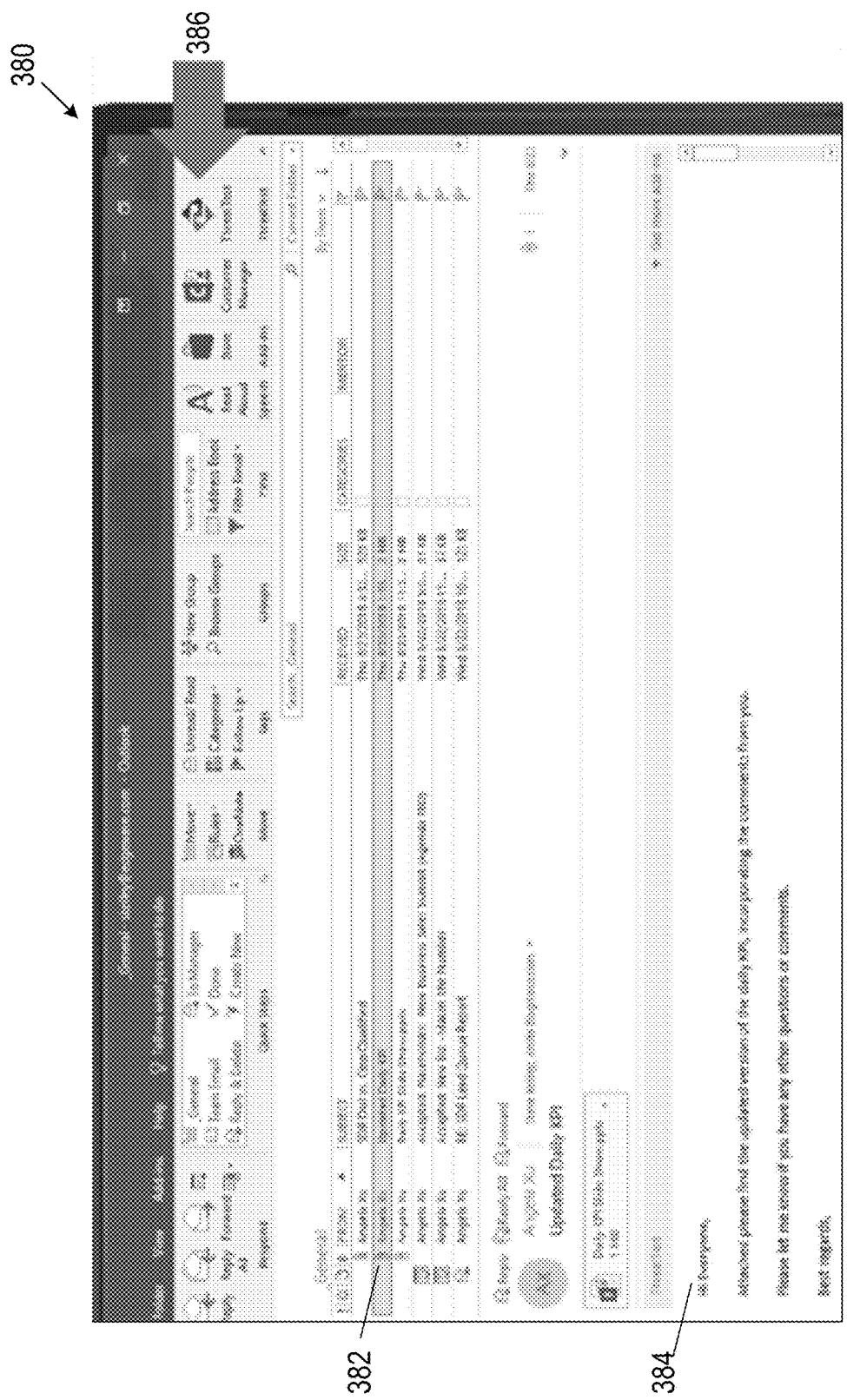
FIG. 3B illustrates an icon on a desktop or laptop computer that a user can select to report a suspicious electronic message.
Figure 3C:
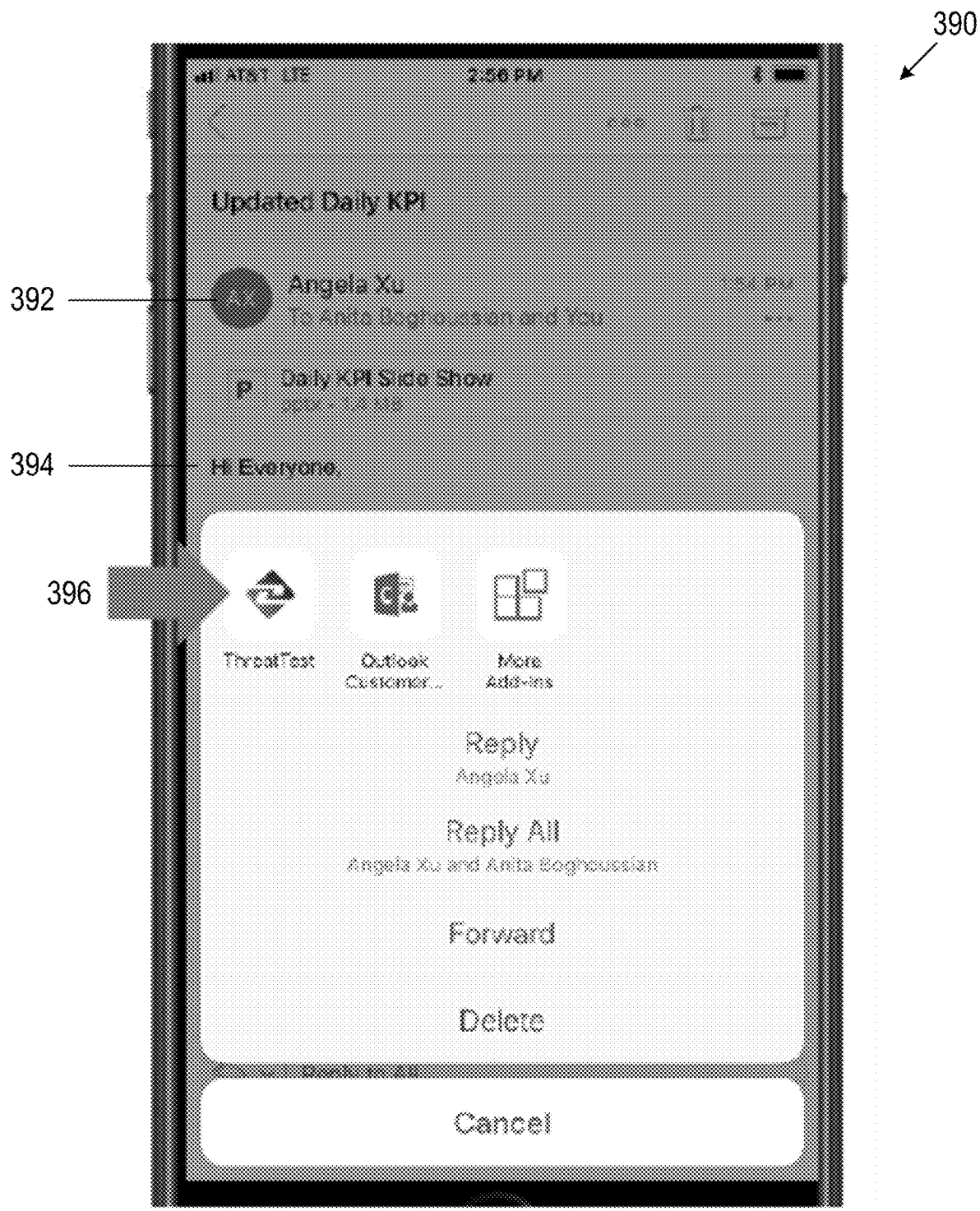
FIG. 3C illustrates an icon on a portable computing device that a user can select to report a suspicious electronic message.

At 320, a user terminal 120 (or computer terminal 200) displays a user-selectable icon to report a suspicious electronic message. For example, the security application add-in (e.g., ThreatTest Outlook add-in) may be configured to display a user-selectable icon or button on the email app. A user reading email messages may see a suspicious email and want to flag that email for further analysis. For example, FIG. 3B illustrates view 380 of an electronic mail application on a desktop or laptop computer that corresponds to a user terminal 120 or computer terminal 200. The view 380 includes a list of emails with a highlighted entry 382. The email 384 corresponding to the highlighted entry is displayed toward the bottom of the screen. The user may select icon 386 if the email 384 is suspicious. Similarly, FIG. 3C illustrates view 390 of an electronic mail application on a smartphone, with a potentially suspicious email 392.

At 330, a user terminal 120 (or computer terminal 200) receives selections of the electronic message and the user-selectable icon. In some implementations, the user may select the suspicious email message and select the add-in icon or button. For example, the icon/button can then call the application to launch. In some aspects, the security application add-in may prompt the user to select whether to mark the suspicious email message as spam or to send the suspicious email to the security application for more analysis. The suspicious email message may then be sent as an attachment from the user's mailbox to a security application server (e.g., ThreatTestLabs).

At 335, a user terminal 120 (or computer terminal 200) quarantines the electronic message in response to the selections so that it is no longer accessible to the user.

The suspicious email message may be electronically communicated, by email, file transfer, or other means, to a destination based on whether the user marks the suspicious email message as spam or sends to the security application for analysis. The security application server may add a first header to the suspicious email message. In some aspects, the first header may include an identifier of the user's mailbox so that the application knows where to send the response to the analysis. For example, the first header may include a REPLY_TO header indicating where to send the response. In some embodiments, the suspicious email message may be intercepted from the user's mailbox by a gateway or spam filter (e.g., ePrism message assurance gateway (MAG)). The gateway may then add the first header to the suspicious email message and forward the modified suspicious email message to the application.

At 340, a user terminal 120 (or computer terminal 200) electronically communicates, the electronic message to a processor for performing threat analysis in response to the selections.

After receiving the suspicious email message with the added first header, the security application server may move the suspicious email message to a folder of the security application server. Once in the folder, the security application may add a second header to the suspicious email message. In some aspects, the second header may comprise a message identifier, an application message identifier, and/or an address to send the response message back to. The message identifier may include an identifier of the suspicious email message. The application message identifier may comprise a unique identifier generated by the security application add-in to identify the suspicious email message. In some implementations, the address comprises a URL that the security application will call to provide the response message back to the application add-in.

In some aspects, information about the suspicious email message may be stored in a security application server database. The information may include information about the suspicious email message, the user, and the chosen option (e.g., spam or send for analysis). In other embodiments, the security application may also generate one or more tags for the suspicious email message to the status of the message is better visible. In other implementations, the security application server can also find the same or similar suspicious email messages sent to other users/mailboxes within the organization and execute respective preventative or remedial actions.

At 350, a user terminal 120 (or computer terminal 200) attaches in response to the forwarding, one or more headers to the electronic message. After the security application receives and processes the suspicious email message, the security application may generate a response message. The response message may comprise an email message from the security application server to the user email app. In some implementations, the response message may be intercepted by a gateway or spam filter (e.g., ePrism MAG) before being forwarded to the user's mailbox. In some aspects, the gateway may forward the response message to the security application add-in mailbox (e.g., ThreatCheck mailbox) on the user's email app (Outlook Exchange). The security application add-in can regularly check the mailbox for responses on reported threats or suspicious emails.

In some aspects, the response email message can include the first header added to the suspicious email message. The response email message can further include a category status information associated with the suspicious email message. In some embodiments, the different category statuses can include a pending, safe, malicious, unprocessed, virus, phish, porn, etc. status associated with the suspicious email message. In some cases, if the response message category status indicates a malicious, virus, phish, or other unsafe status, the security application may delete the suspicious email message from the security application server folder.

Additionally, the security application add-in can tag the response messages with the received status for better visibility. The security application add-in may also find related messages sent to other users/mailboxes and execute the respective actions based on the received status from the security application server (e.g., ThreatCheckLabs).

In some aspects, the security application add-in (e.g., ThreatCheck plug-in) may perform threat detection action independently of user selection. For example, the security application add-in may periodically scan and find copies of reported suspicious email messages in all mailboxes within an organization. It can then gather those messages into a database table for quicker execution of received security countermeasures. In some embodiments, the security application add-in may notify users of or delete suspicious email that were previously reported on other users' mailboxes but not explicitly reported by a user. Additionally, the security application add-in can execute rules defined by email security systems (e.g., EdgeWave ePrism) or use fingerprint matching algorithms to compare messages in all mailboxes with previously reported emails to identify malicious messages in all mailboxes within the organization which have reached the mailboxes earlier where no corresponding protection rules were present. Such execution can help prevent infection of viruses or users from receiving malicious email. In some embodiments, the security application add-in can move identified suspicious messages to a quarantine folder, a Junk folder, or any other defined folder based on executed protection criteria in all mailboxes within the organization.

In some aspects, in order to access user mailboxes within an organization or send emails on behalf of them, a technical super-user can be created. The technical super-user can be configured in the security application (e.g., ThreatCheck) settings in the central administration. The technical super-user can have a full access to the mailbox(es) which will be integrated with the security application. In order to see all or selected users within an organization a provisioning job can be configured and the super-user can have at least a "View-Only Organization Management" right on the email app (e.g., Outlook Exchange). For deploying the security application Outlook, or other email app, add-in the technical super-user can have the role "Org Custom Apps" assigned. This role enables the technical super-user to deploy and manage custom apps for the whole organization.

In some embodiments a method of user reporting and resulting automatic processing of a suspicious email message can be performed. All of the operations of method may be performed in a given one of computer terminals 120 and/or server 130. Alternatively, the operations may be divided among multiple ones of the computer terminals 120 and server 130 in accordance with the disclosed herein.

In some aspects, a computer terminal 120 receives email messages in connection with a user account associated with a user name and a corresponding email address. That is, the received email messages are addressed to the email address associated with user account. The user may select a suspicious email message and report the selected suspicious email message by selecting a button associated with a security application. The security application may be configured to analyze and report a threat status to the user regarding the reported suspicious email. After receiving the selection of the suspicious email message, the security application may add one or more headers to the received suspicious email message and forward the modified suspicious email message for further analysis. The security application may perform threat analysis and/or receive an indication of the results of the threat analysis. The security application may then send a response message to the user indicating a status/result of the threat analysis. In some aspects, the security application may delete the suspicious email message if the threat analysis indicates a malicious or harmful status.

At 360, a user terminal 120 (or computer terminal 200) receives a response message in response to the performed threat analysis, the response message comprising the one or more headers and indicating a threat status of the electronic message. In various embodiments, the threat status includes a traffic light indicator. The traffic light indicator may be red or stop for electronic messages corresponding to a known threat. In response to a known threat, the user is informed that the email is a known threat. The email is tagged as a known threat and may be erased or neutralized. The traffic light indicator may be yellow or caution for electronic messages corresponding to a possible threat. The email is tagged as a possible threat, and the user may be advised to contact the sender by phone or other means. The traffic light indicator may be green or proceed for electronic messages not associated with a known threat or suspected of being a threat. The email is then tagged as not associated with a known threat. In various embodiments, the threat status includes a threat category that indicates that the electronic message is, for example, a safe message, a malicious message, a phishing message, a virus, a spam message, and/or a pornographic message.

At 370, a user terminal 120 (or computer terminal 200) process the electronic message in response to the response message. For example, the user terminal 120 (or computer terminal 200) may delete the electronic message, leave the electronic message in quarantine, and/or move the electronic message to the first folder.

In various embodiments, computer terminal 200 updates a blacklist and/or a predelivery checklist in response to the threat status of the electronic message.

In various embodiments, computer terminal 200 or a server 130 scans the electronic message before it is viewed by the user. The computer terminal 200 or the server 130 electronically communicates the electronic message to the processor for performing threat analysis in response to and one of the following conditions. The first condition is if a sender of the electronic message has not sent a previous electronic message to the email address of the user. The second condition is if there is a variation in a spelling of a name of the sender as compared to previous electronic messages sent by the sender to the email address of the user. The third condition is if the electronic message originates from a sending system that is not associated with other electronic messages received by the email address of the user. The fourth condition is if the electronic message has a calculated fingerprint that matches a fingerprint in a fingerprint database having a malicious threat status at a confidence level less than a confidence level threshold.

Figure 4:
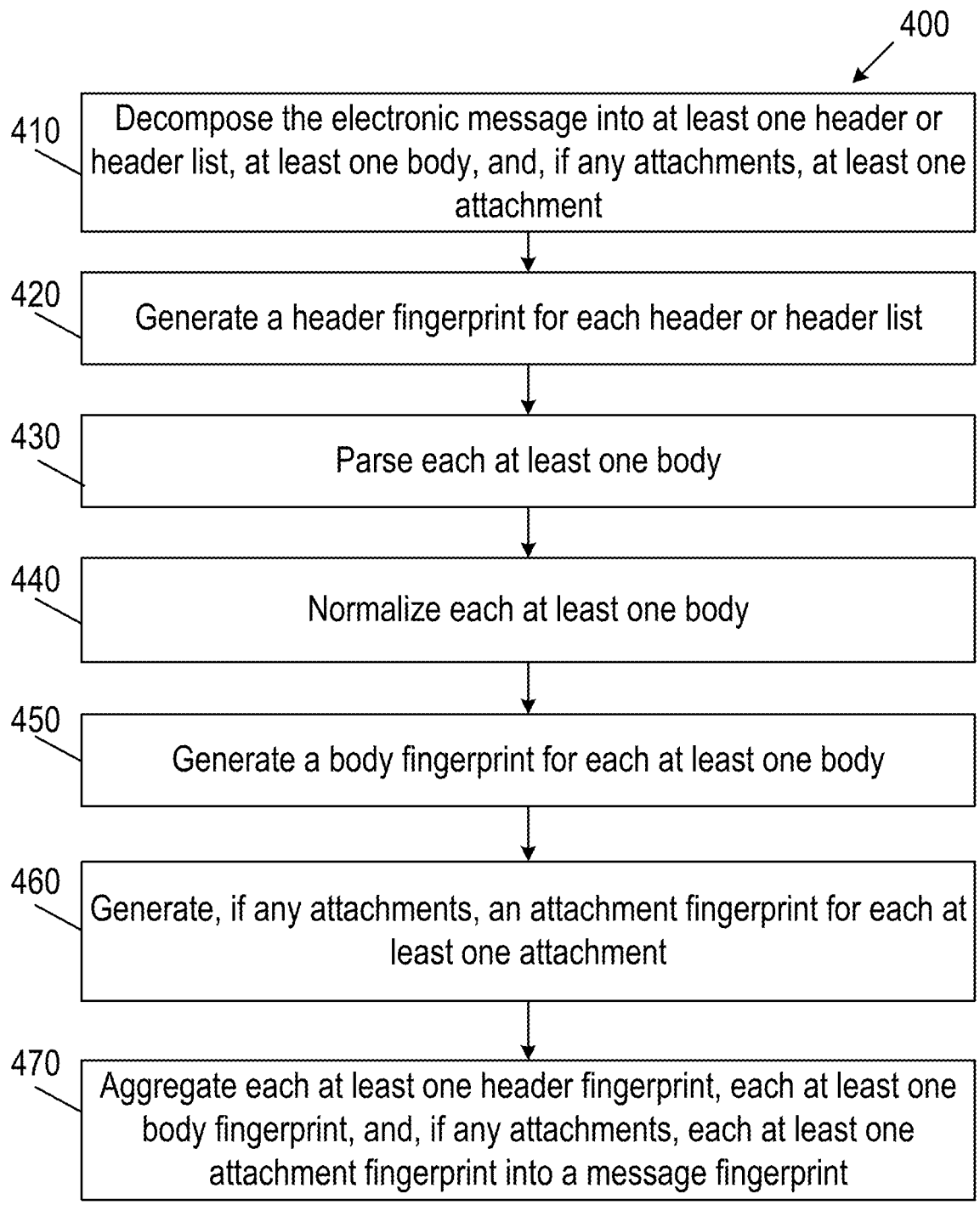
FIG. 4 is a flowchart of a process for decomposing, parsing, normalizing, and fingerprinting an electronic message, consistent with FIG. 3A and the present description.

FIG. 4 is a flowchart of a process 400 for decomposing, parsing, normalizing, and fingerprinting an electronic message, consistent with FIG. 3A and the present description. Referring to FIGS. 1, 2, and 4, the process 400 may be performed by the computer terminal 200, which may correspond to one of the computer terminals 120A, 120B, or 120C, or server 130 of computer network 100.

At 410, the computer terminal 200 decomposes the electronic message into at least one header or header list, at least one body, and if the electronic message includes any attachments, at least one attachment. Electronic message headers may, for example, specify the sender's name, email address, and IP address, the recipient's name and email address, the date and time the email was sent, a subject, and routing information. Fields such as routing information may be included in a header list, with multiple values, since a message may be routed multiple times between sender and receiver. The message may include multiple headers and/or header lists. The body of an email may include blocks of text, embedded uniform resource locators (URL), or be binary formatted. Examples of binary formatted bodies are embedded images, embedded video, and executable code. Attachments to an electronic message may include text formatted attachments and binary formatted attachments, such as executable files. In various embodiments, the electronic message is decomposed iteratively. For example an electronic message may first be decomposed into header, body, and attachment components. Then, header components may be decomposed to single header key/value pairs. Attachments may be decomposed into the individual text and binary attachments. The body may be decomposed into text blocks, URLs, and binaries. Once decomposed, each header, body, and attachment can be fingerprinted or characterized. A fingerprint corresponds to a vector of feature values that characterize each decomposed element, whether a header, body, or attachment element of the electronic message. As used herein, a body may correspond to a portion of, or an entire, message body. Similarly, a header may refer to one or more header and or header list entries. An attachment may refer to a portion of an attachment, a single attachment, or multiple attachments.

At 420, the computer terminal 200 generates a header fingerprint for each at least one header or header list, by lexically analyzing, applying a header hash algorithm, and/or applying a header list hash algorithm, as described below. In various embodiments, the computer terminal 200 lexically analyzes each at least one header or header list. Lexically analyzing a header or header list may include identifying each type of header or header list. Lexically analyzing a header or header list may include analyzing the lexical format of each header or header list. Lexically analyzing a header or header list may include analyzing frequency and patterns of white space within each header or header list. Lexically analyzing a header or header list may include analyzing frequency and patterns of special characters within each header or header list. Lexically analyzing a header or header list may include comparing the source and message routing in a header list for consistency. In various embodiments, generating a header fingerprint includes applying, for each header, a header hash algorithm to the at least one header. Generating a header fingerprint may include applying, for each header list, a header list hash algorithm to the at least one header list.

At 430, the computer terminal 200 parses each at least one body. In various embodiments, parsing the at least one body comprises identifying and organizing components of each at least one body using syntactic and/or semantic analysis. By identifying and organizing components within a body, common elements can be grouped, and message information presented for automatic or manual review in a consistent manner from message to message, in order to speed processing and improve consistency.

At 440, the computer terminal 200 normalizes each at least one body. Malicious actors may embed extra white spaces, include accented letters (such as umlauts), replace capital O letters with zeros, transpose letters, or take other means to fool spam or other malicious email detectors. Normalizing each at least one body may reverse these actions by, for example, removing extra spaces, normalizing white spaces, transposing letters to correct spelling, removing excess punctuation, removing hyphenation, removing hypertext markup language, and/or replacing incorrectly substituted characters, such as Os for zeros, or unaccented characters for accented characters with diacritical marks.

At 450, the computer terminal 200 generates a body fingerprint for each parsed and normalized at least one body. In various embodiments, generating a body fingerprint for each parsed and normalized at least one body includes applying, for each URL, a URL hash algorithm to generate a URL body fingerprint for each URL. In various embodiments, generating a body fingerprint for each parsed and normalized at least one body includes applying, for each text formatted body, a text body hash algorithm to generate a text body fingerprint for each text body. In various embodiments, generating a body fingerprint for each parsed and normalized at least one body includes applying, for each binary formatted body, a binary body hash algorithm to generate a binary body fingerprint for each binary formatted body. In various embodiments, the URL hash algorithm includes a traditional hash. In various embodiments, the body hash algorithm includes a similarity hash. In various embodiments, the binary body hash algorithm includes a fuzzy hash.

At 460, the computer terminal 200 generates, if there are any attachments in the electronic message, an attachment fingerprint for each at least one attachment. In various embodiments, generating an attachment fingerprint for each attachment includes applying, for each text formatted attachment, a text attachment hash algorithm to generate a text attachment fingerprint for each text attachment. In various embodiments, generating an attachment fingerprint for each attachment includes applying, for each binary formatted attachment, a binary attachment hash algorithm to generate a binary attachment fingerprint for each binary formatted attachment. In various embodiments, the text attachment hash algorithm includes a similarity hash. In various embodiments, the binary attachment hash algorithm includes a fuzzy hash.

At 470, the computer terminal 200 aggregates each at least one header fingerprint, each at least one body fingerprint, and, if the electronic message includes any attachments, each at least one attachment fingerprint, into a message fingerprint. In various embodiments, aggregating the header, body, and attachment fingerprints may include generating a fingerprint vector by concatenating the header, body, and attachment fingerprint vectors. In various embodiments, the individual header, body, and attachment fingerprints may be normalized with regard to mean and variance. In various embodiments, a factor analysis or principle components analysis may be applied to reduce the dimensionality of the fingerprint vector.

Figure 5A:
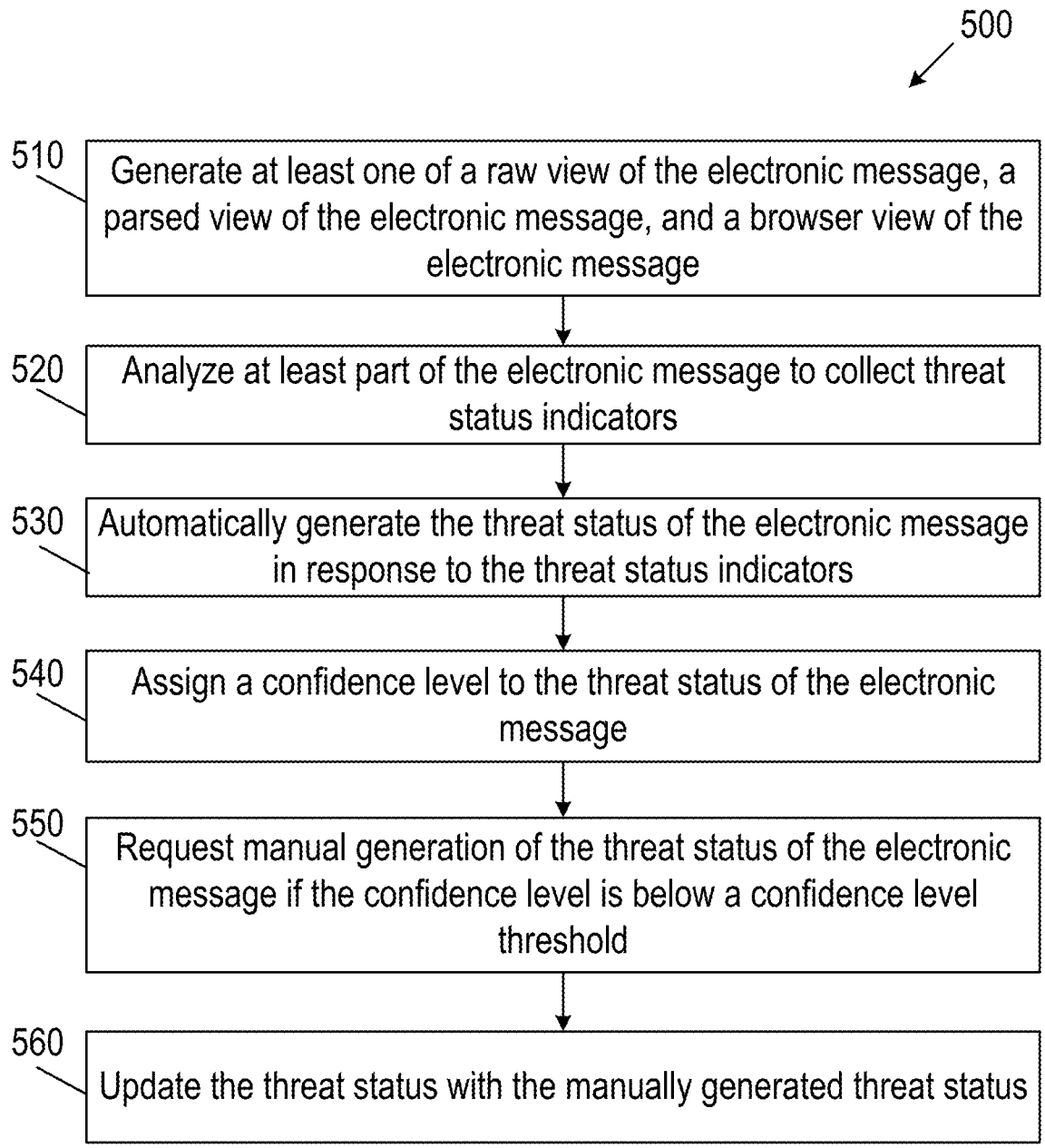
FIG. 5A is a flowchart of a process for complementary automatic and manual generation of a threat status for an electronic message, consistent with FIGS. 3 and 4 and the present description.

FIG. 5A is a flowchart 500 of a process for complementary automatic and manual generation of a threat status for an electronic message, consistent with FIGS. 3 and 4 and the present description. In various embodiments, process 500 may be a continuation of process 400. Referring to FIGS. 1, 2, and 5, the process 500 may be performed by the computer terminal 200, which may correspond to one of the computer terminals 120A, 120B, or 120C, or server 130 of computer network 100.

Figure 5B:
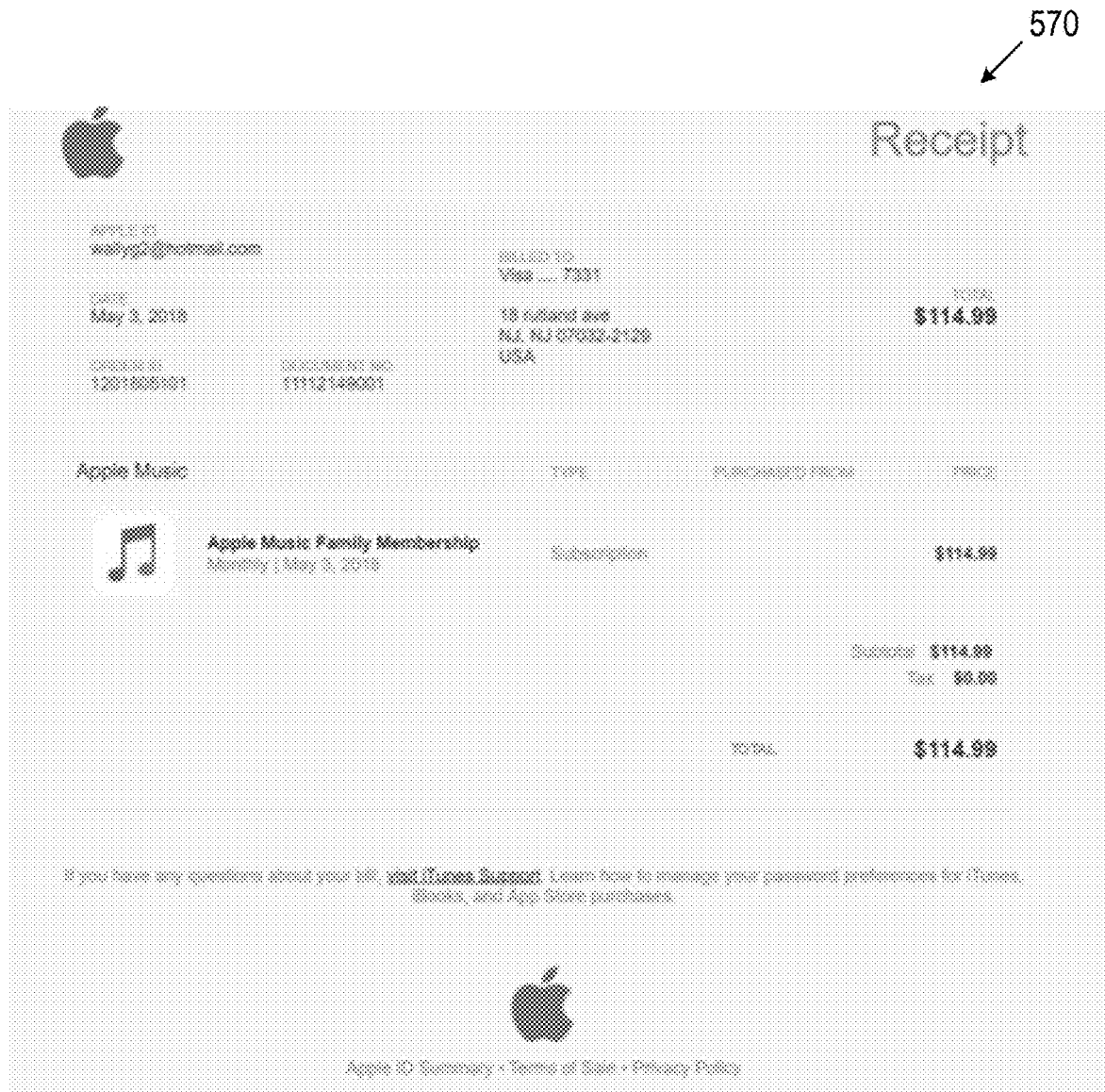
FIG. 5B is a browser view of an electronic message.

At 510, the computer terminal 200 generates at least one of a raw view of the electronic message, a parsed view of the electronic message, and a browser view of the electronic message. FIGS. 5B, 5C, and 5D depict a browser view 570, a raw view 580, and a cooked view 590, respectively, of an electronic message. In various embodiments, the browser view of the electronic message corresponding to an HTML view of the electronic message. In various embodiments, the raw view of the electronic message corresponds to the text of the electronic message before parsing and normalizing the at least one body. In various embodiments, the parsed view of the electronic message corresponds to a reordering of the electronic message into a consistent format after parsing and normalizing the at least one body. The different views of the electronic message may be used by automated tools that detect or identify threats, or by a human reviewer.

At 520, the computer terminal 200 analyzes at least part of the electronic message to collect threat status indicators. In various embodiments, the computer terminal 200 applies machine learning based methods or other analysis tools to generate threat status indicators. The generated threat status indicators may correspond to features or characteristics of the a least part of the electronic message that correspond to, or correlate with, threats. For example the threat status indicators may correspond to patterns or the results of analyses that correspond to one or more threats.

At 530, the computer terminal 200 automatically generates the threat status of the electronic message in response to the threat status indicators. The threat status indicators generated in 520 may correspond to a threat status. For example, threat status indicators, singly or in combination, may map to a threat status. The threat status indicator for an electronic message may correspond to a point in a threat status indicator space that corresponds to a threat. A Bayesian, rule based, clustering, neural network, correlation, or statistically based technique may be used to assign threat status indicators to a threat status. Some rule patterns may correspond to very high confidence that an electronic message is a threat.

At 540, the computer terminal 200 assigns a confidence level to the threat status of the electronic message. Each threat status determined at 530 may have a confidence level. In various embodiments, the confidence level may be on a 0 to 1 scale, where 1 correspond to 100% confident and 0 corresponds to 0% confident. In various embodiments, the confidence level may be based on a statistical likelihood that the threat status indicators that may be close to 1 for a high confidence level, or close to 0 for a low confidence level.

At 550, the computer terminal 200 requests manual generation of the threat status of the electronic message if the confidence level is below a confidence level threshold. For example, a threshold of 90% may be used. Lower thresholds may result in more electronic messages being forwarded to a human reviewer. In various implementations, requesting manual generation of the threat status of the electronic message includes providing, for manual review, a heatmap of the aggregated fingerprint and the threat status indicators for the electronic message, the raw view of the electronic message, the parsed view of the electronic message, the browser view of the electronic message, and/or the threat status indicators. A heatmap may be a visual representation of the message fingerprint and/or threat status indicators. Heatmap make it possible to visualize, and highlight with color, specific vector elements for analysis. The heatmap may include a matrix of squares, each color coded to highlight significant elements. With training, a human reviewer may use heatmaps to more quickly review and analyze large quantities of data.

At 560, the computer terminal 200 updates the threat status with the manually generated threat status. In various implementations, a new rule may be added to the rules database corresponding to the threat status for the electronic message. In various implementations, the message fingerprint may be added to the fingerprint database corresponding to the threat status for the electronic message.

Figure 6:
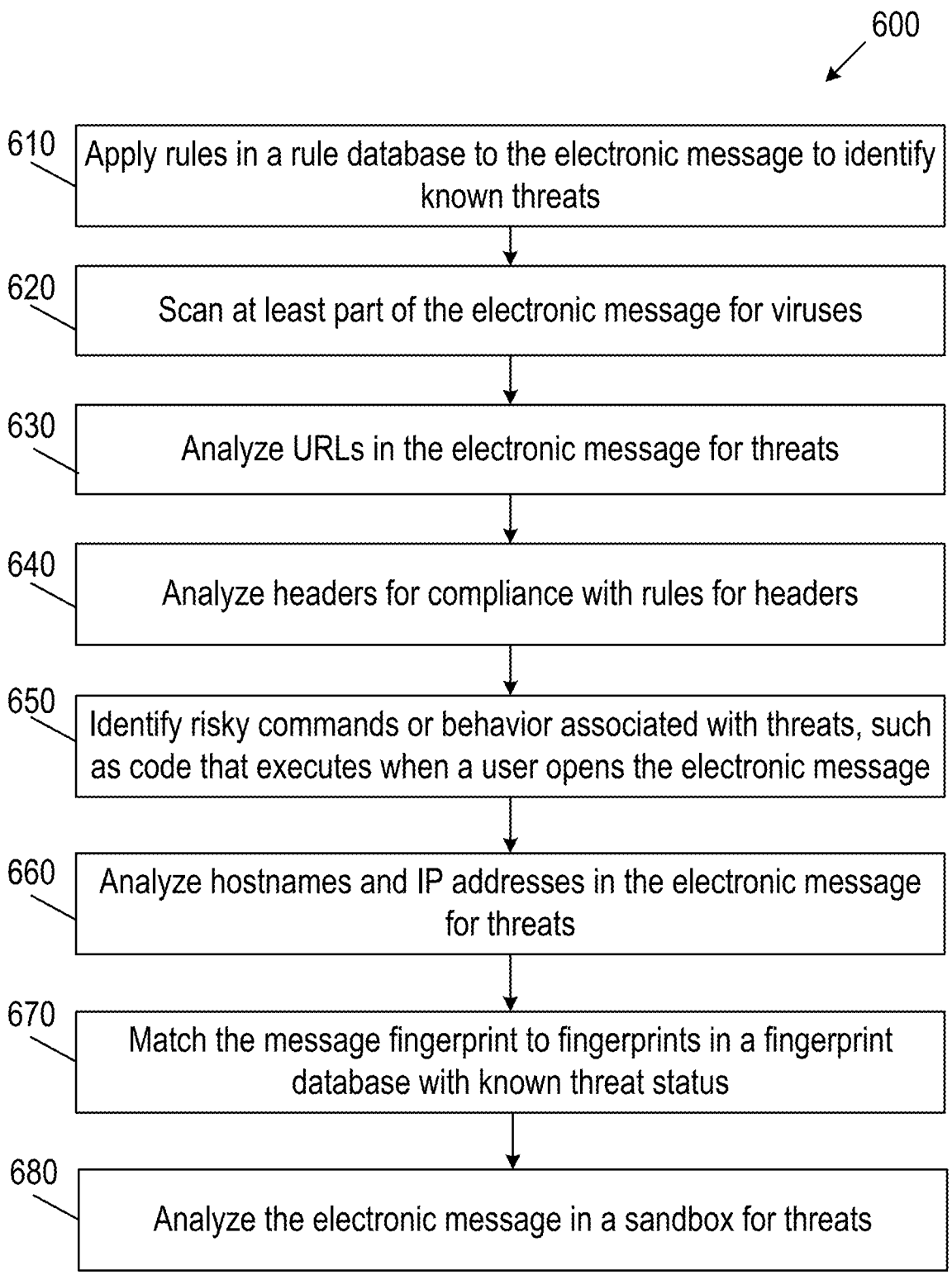
FIG. 6 is a flowchart of a process for generating threat status indicators, consistent with FIGS. 3, 4, and 5, and the current description.

FIG. 6 is a flowchart of a process 600 for generating threat status indicators, consistent with FIGS. 3, 4, and 5, and the current description. Referring to FIGS. 1, 2, and 6, the process 500 may be performed by the computer terminal 200, which may correspond to one of the computer terminals 120A, 120B, or 120C, or server 130 of computer network 100. For example, the computer terminal 200 may process 610, 620, 630, 640, 650, 660, 670, and 680 in the serial order shown in FIG. 6. In various implementations, the computer terminal 200 may process 610, 620, 630, 640, 650, 660, 670, and 680 in a different order, and/or in parallel.

At 610, the computer terminal 200 applies rules in a rule database to at least part of the electronic message to identify known threats. Computer terminal 200 collects threat status indicators by applying hundreds, thousands, tens of thousands, or more rules in the rules database to at least part of the electronic message to identify whether each of the rules matches the at least part of the electronic message. The rules in the rules database were previously assigned a rule threat status, as each rule corresponds to a known threat. Each identified matching rule and each corresponding rule threat status corresponds to a threat status indicator. In various embodiments, the rules are generated manually to correspond to particular threats. A rules database may include tens of thousands or more rules. Analysts may add rules as new threats are analyzed. Applying the known rules from the rules database may be a good first step to quickly identify known spam or other threats. The rules database may be more up-to-date than rules databases used by pre-delivery systems.

At 620, the computer terminal 200 scans at least part of the electronic message for viruses. In various embodiments, one or more virus checker, each with at least one associated virus database, may be used to scan the electronic message and generate a threat status indicator if there are any matches to a virus in a virus database. Each identified virus corresponds to a threat status indicator for the scan.

At 630, the computer terminal 200 queries a URL threat database for each URL in the electronic message to identify whether the at least one URL in the electronic message comprises at least one URL in the at least one URL threat database. Each identified URL in the URL threat database and corresponding URL threat status correspond to the threat status indicator for the URL threat database query.

At 640, the computer terminal 200 analyzes the at least one header for compliance with at least one rule for headers. For example, an electronic message should have only one message ID. If an electronic message includes more than one message ID, the electronic message may be a threat.

At 650, the computer terminal 200 identifies a risky command or behavior within the electronic message. For example, an electronic message that executes code or a macro when a user opens the electronic message, or when a user opens an attachment, may be a threat.

At 660, the computer terminal 200 analyzes hostnames and IP addresses in at least one part of the electronic message for threats. The computer terminal 200 extracts IP addresses, and domain names from headers, and URLs within the at least one part of the electronic message. The computer terminal 200 resolves extracted domain names to IP addresses. For each domain name, the computer terminal 200 identifies a registration age, a domain name reputation, and an obfuscation. For each IP address, the computer terminal 200 identifies an IP address reputation and a geolocation. Next, the computer terminal 200 determines a domain name service threat status corresponding to the threat status indicator for the domain name service analysis.

At 670, the computer terminal 200 compares the message fingerprint with multiple fingerprints in a fingerprint database. The fingerprints in the fingerprint database were previously assigned a fingerprint threat status. Each identified matching fingerprint and each corresponding fingerprint threat status corresponds to a threat status indicator. The match between the message fingerprint and the type of match an exact match, an inclusive match, a similarity hash match, and/or a fuzzy hash match. In an exact match, the fingerprints are identical. In an inclusive match, one fingerprint is a subset of the other. In a similarity hash match and a fuzzy hash match, a distance between the two fingerprints is within a certain threshold.

At 680, the computer terminal 200 analyzes the electronic message in a security sandbox for threats. The messages is sent to a sandbox system, which may be a compartmentalized computing environment, implemented as a virtual machine or a separate computing infrastructure. The sandbox system is designed to isolate and monitor for security flaws. The message is activated in that system while monitoring for suspicious execution traits and comparing these to a database of known traits. A threat score is calculated based on, for example, the sum of suspicious execution traits and their associated individual scores.

Without in any way limiting the scope, interpretation, or application of the claims appearing herein, a technical effect of one or more of the example embodiments disclosed herein may include increasing the ease and efficiency at which suspicious email messages can be screened. Without in any way limiting the scope, interpretation, or application of the claims appearing herein, a technical effect of one or more of the example embodiments disclosed herein may include providing more effective analysis of suspicious email messages on a user device. Additional technical effects of one or more of the example embodiments may include closed-loop, advanced phishing protection, visibility into the types of attacks occurring, and visibility into when the attacks occur.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein, when reference is made to a file, it may also comprise at least a portion of the file. For example, when a file is executed, this may also include executing at least a portion of the file.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
    receiving an electronic message associated with an email address of a user into a first folder;
    presenting a user-selectable icon for display to report a suspicious electronic message;
    receiving selections of the user-selectable icon;
    quarantining the electronic message in response to the selections;
    decomposing the electronic message into at least one header or header list, at least one body, and, when the electronic message comprises an attachment, at least one attachment;
    generating a header fingerprint for each at the least one header or header list;
    parsing each at the least one body;
    normalizing each at the least one body;
    generating a body fingerprint for each parsed and normalized at the least one body;
    generating, when the electronic message comprising an attachment, an attachment fingerprint for each at the least one attachment; and
    aggregating each at the least one header fingerprint, each at the least one body fingerprint, and, when the electronic message comprises the attachment, each at the least one attachment fingerprint, into a message fingerprint;
    electronically communicating the electronic message to a processor for performing threat analysis;
    attaching the one or more headers to the electronic message; processing the electronic message in response to the response message, the processing including at least one of deleting the electronic message, leaving the electronic message in quarantine, and/or moving the electronic message to the first folder,
    wherein performing the threat analysis comprises:
        generating at least one of a raw view of the electronic message, a parsed view of the electronic message, and a browser view of the electronic message;
        analyzing at least part of the electronic message to collect the threat status indicators;
        automatically generating the threat status of the electronic message in response to the threat status indicators;
        assigning a confidence level to the threat status of the electronic message;
        requesting manual generation of the threat status of the electronic message when the confidence level is below a confidence level threshold; and
        updating the threat status with the manually generated threat status,
        wherein analyzing at least part of the electronic message to collect the threat status indicators comprises identifying a risky command or behavior within the electronic message.

2. The method of claim 1, further comprising updating a blacklist and/or a predelivery checklist in response to the threat status of the electronic message.

3. The method of claim 1, further comprising electronically communicating the electronic message to the processor for performing the threat analysis in response to at least one of:
    a sender of the electronic message has not sent a previous electronic message to the email address of the user, the electronic message having a calculated fingerprint that matches a fingerprint in a fingerprint database having a malicious threat status at a confidence level less than a confidence level threshold.

4. The method of claim 1, wherein the threat status comprises a traffic light indicator, the traffic light indicator red or stop for electronic messages corresponding to a known threat, the traffic light indicator yellow or caution for electronic messages corresponding to a possible threat, the traffic light indicator green or proceed for electronic messages not associated with a known threat or suspected of being a threat, and wherein the threat status comprises a threat category.

5. The method of claim 4, wherein the threat category comprises at least one of a safe message, a malicious message, a phishing message, a virus, a spam message, and/or a pornographic message.

6. The method of claim 1, further comprising moving to quarantine other electronic messages with message fingerprints in a fingerprint database that match the message fingerprint of the electronic message.

7. The method of claim 1, wherein each at least one body comprises at least one of a uniform resource locator (URL), a text formatted body, and a binary formatted body, and wherein each attachment comprises at least one of a text formatted attachment and a binary formatted attachment.

8. The method of claim 1, wherein generating a header fingerprint for each at least one header or header list comprises at least one of:
    lexically analyzing each at least one header or header list, wherein lexically analyzing comprises at least one of identifying the number of each type of header or header list, analyzing the lexical format of each header or header list, analyzing frequency and patterns of white space within each header or header list, analyzing frequency and patterns of special characters within each header or header list, and comparing the source and message routing in a header list for consistency;
    applying, for each header, a header hash algorithm to the at least one header; and/or
    applying, for each header list, a header list hash algorithm.

9. The method of claim 1, wherein parsing the at least one body comprises identifying and organizing components of each at least one body using syntactic and/or semantic analysis.

10. The method of claim 1, wherein normalizing the at least one body comprises at least one of normalizing white spaces, transposing letters to correct spelling, removing excess punctuation, removing hyphenation, removing hypertext markup language, and/or replacing incorrectly substituted characters.

11. The method of claim 7, wherein generating a body fingerprint for each parsed and normalized at least one body comprises:
 applying, for each URL, a URL hash algorithm to generate a URL body fingerprint for each URL;
 applying, for each text formatted body, a text body hash algorithm to generate a text body fingerprint for each text body; and
 applying, for each binary formatted body, a binary body hash algorithm to generate a binary body fingerprint for each binary formatted body.

12. The method of claim 11, wherein the URL hash algorithm comprises a traditional hash, wherein the text body hash algorithm comprises a similarity hash, and wherein the binary body hash algorithm comprises a fuzzy hash.

13. The method of claim 7, wherein generating an attachment fingerprint for each attachment comprises:
 applying, for each text formatted attachment, a text attachment hash algorithm to generate a text attachment fingerprint for each text attachment; and
 applying, for each binary formatted attachment, a binary attachment hash algorithm to generate a binary attachment fingerprint for each binary formatted attachment.

14. The method of claim 13, wherein the text attachment hash algorithm comprises a similarity hash, and wherein the binary attachment hash algorithm comprises a fuzzy hash.

15. The method of claim 1, wherein the raw view of the electronic message corresponds to the text of the electronic message before parsing and normalizing the at least one body, wherein the parsed view of the electronic message corresponds to a reordering of the electronic message into a consistent format after parsing and normalizing the at least one body, and wherein the browser view of the electronic message corresponding to an HTML, view of the electronic message after parsing and normalizing the at least one body.

16. The method of claim 1, wherein analyzing at least part of the electronic message to collect threat status indicators comprises applying a plurality of rules in a rules database to at least part of the electronic message to identify whether each of the plurality of rules matches the at least part of the electronic message, the rules in the rules database previously assigned a rule threat status, each identified matching rule and each corresponding rule threat status corresponding to threat status indicators.

17. The method of claim 1, wherein analyzing at least part of the electronic message to collect threat status indicators comprises scanning the at least part of the electronic message to identify whether the at least part of the electronic message comprises at least one virus in at least one antivirus database, each identified virus corresponding to the threat status indicator for the scan.

18. The method of claim 1, wherein analyzing at least part of the electronic message to collect threat status indicators comprises:
 querying a URL threat database for at least a URL and URL threat status, for each URL in the electronic message to identify whether the at least one URL in the electronic message comprises at least one URL in the at least one URL threat database, each identified URL in the URL threat database and corresponding URL threat status corresponding to the threat status indicator for the URL threat database query.

19. The method of claim 1, wherein analyzing at least part of the electronic message to collect threat status indicators comprises analyzing the at least one header for compliance with at least one rule for headers.

20. The method of claim 19, wherein the rule for headers comprises including no more than one message ID in an electronic message.

21. The method of claim 1, wherein the risky command or behavior comprises executing code or a macro when the user opens the electronic message or one of the at least one attachments.

22. The method of claim 1, wherein analyzing at least part of the electronic message to collect threat status indicators comprises a domain name service analysis comprising:
 extracting IP addresses, and domain names from headers, and URLs within the at least one part of the electronic message,
 resolving extracted domain names to IP addresses;
 for each domain name, identify a registration age, a domain name reputation, and an obfuscation,
 for each IP address, identify an IP address reputation and a geolocation; and
 determine a domain name service threat status corresponding to the threat status indicator for the domain name service analysis.

23. The method of claim 1, wherein analyzing at least part of the electronic message to collect threat status indicators comprises comparing the message fingerprint with a plurality of fingerprints in a fingerprint database, the fingerprints in the fingerprint database previously assigned a fingerprint threat status, each identified matching fingerprint and each corresponding fingerprint threat status corresponding to threat status indicators, the type of match an exact match, an inclusive match, a similarity hash match, and/or a fuzzy hash match.

24. The method of claim 1, wherein analyzing at least part of the electronic message to collect threat status indicators comprises:
 electronically communicating the electronic message to a security sandbox, the security sandbox a compartmentalized computing environment designed to isolate and monitor security flaws;
 activating the electronic message in the security sandbox;
 monitoring the activated electronic message for suspicious execution traits;
 identifying the suspicious execution traits in a database of known suspicious execution traits; and
 calculating a sandbox threat status indicator in response to the identified suspicious execution traits.

25. The method of claim 1, wherein requesting manual generation of the threat status of the electronic message comprises providing, for manual review, a heatmap of the aggregated fingerprint and the threat status indicators for the electronic message, the raw view of the electronic message, the parsed view of the electronic message, the browser view of the electronic message, and/or the threat status indicators.

26. A system, comprising:
 at least one data processor; and
 memory storing instructions which, when executed by the at least one data processor, result in operations comprising:

receiving an electronic message associated with an email address of a user into a first folder;

quarantining the electronic message;

decomposing the electronic message into at least one header or header list, at least one body, and, when the electronic message comprises an attachment, at least one attachment;

generating a header fingerprint for each at the least one header or header list;

parsing each at the least one body;

normalizing each at the least one body;

generating a body fingerprint for each parsed and normalized at the least one body;

generating, when the electronic message comprising an attachment, an attachment fingerprint for each at the least one attachment;

aggregating each at least one header fingerprint, each at least one body fingerprint, and, when the electronic message comprises an attachment, each at least one attachment fingerprint, into a message fingerprint;

attaching the one or more headers to the electronic message;

receiving a response message in response to the performed threat analysis, the response message comprising the one or more headers and indicating a threat status of the electronic message; and processing the electronic message in response to the response message the processing including at least one of deleting the electronic message, leaving the electronic message in quarantine, and/or moving the electronic message to the first folder, wherein performing the threat analysis comprises:
generating at least one of a raw view of the electronic message, a parsed view of the electronic message, and a browser view of the electronic message;

analyzing at least part of the electronic message to collect threat status indicators;

automatically generating the threat status of the electronic message in response to the threat status indicators;

assigning a confidence level to the threat status of the electronic message;

requesting manual generation of the threat status of the electronic message when the confidence level is below a confidence level threshold; and updating the threat status with the manually generated threat status, wherein analyzing at least part of the electronic message to collect threat the status indicators comprises identifying a risky command or behavior within the electronic message.

27. A non-transitory computer-readable medium storing instructions, which when executed by at least one data processor, result in operations comprising:

receiving an electronic message associated with an email address of a user into a first folder;

quarantining the electronic message;

decomposing the electronic message into at least one header or header list, at least one body, and, when the electronic message comprises an attachment, at least one attachment;

generating a header fingerprint for each at the least one header or header list;

parsing each at the least one body;

normalizing each at the least one body;

generating a body fingerprint for each parsed and normalized at the least one body;

generating, when the electronic message comprising an attachment, an attachment fingerprint for each at the least one attachment;

aggregating each at the least one header fingerprint, each at the least one body fingerprint, and, when the electronic message comprises the attachment, each at the least one attachment fingerprint, into a message fingerprint;

electronically communicating the electronic message to a processor for performing threat analysis;

attaching the one or more headers to the electronic message;

receiving a response message in response to the performed threat analysis, the response message comprising the one or more headers and indicating a threat status of the electronic message; and generating at least one of a raw view of the electronic message, a parsed view of the electronic message, and a browser view of the electronic message;

analyzing at least part of the electronic message to collect threat status indicators;

automatically generating the threat status of the electronic message in response to the threat status indicators;

assigning a confidence level to the threat status of the electronic message;

requesting manual generation of the threat status of the electronic message when the confidence level is below a confidence level threshold; and updating the threat status with the manually generated threat status, wherein analyzing at least part of the electronic message to collect the threat status indicators comprises identifying a risky command or behavior within the electronic message.

* * * * *